United States Patent [19]

Takada et al.

[11] 4,415,786
[45] Nov. 15, 1983

[54] APPARATUS FOR DETECTING THE NEUTRAL POSITION OF A MANUAL TRANSMISSION FOR MOTOR VEHICLES

[75] Inventors: Toshiaki Takada, Yokohama; Kazuyoshi Hiraiwa, Atsugi, both of Japan

[73] Assignee: Nissan Motor Co., Ltd., Yokohama, Japan

[21] Appl. No.: 361,261

[22] Filed: Mar. 24, 1982

[30] Foreign Application Priority Data

Mar. 25, 1981 [JP] Japan .................................. 56-42406

[51] Int. Cl.³ ............................................. H01H 3/16
[52] U.S. Cl. ............................. 200/61.91; 74/DIG. 7; 200/61.88
[58] Field of Search ................ 200/61.91; 74/DIG. 7, 74/61.88, 61.28

[56] References Cited

U.S. PATENT DOCUMENTS 3,943,792  3/1976  Sibeud .......................... 200/61.91 X Primary Examiner—Elliot A. Goldberg
Assistant Examiner—Morris Ginsburg
Attorney, Agent, or Firm—Schwartz, Jeffery, Schwaab, Mack, Blumenthal & Koch

[57] ABSTRACT

In an apparatus for detecting neutral state of a manual transmission for motor vehicles, a first and a second recess are provided which are movable with a first and a second shift rod, respectively. A swingable arm is provided which is arranged to be disposed in engagement with both the first and second recesses only when both the first and second shift rods are in their neutral positions. A switch means is provided which is arranged to be closed when the arm is disposed in engagement with both the first and second recesses, and opened when the arm is disposed out of engagement with first and second recesses.

2 Claims, 6 Drawing Figures

APPARATUS FOR DETECTING THE NEUTRAL POSITION OF A MANUAL TRANSMISSION FOR MOTOR VEHICLES

BACKGROUND OF THE INVENTION

The present invention relates to an apparatus for detecting the neutral state of a manual transmission for motor vehicles.

The neutral state of the transmission of a motor vehicle should be detected in order to purify exhaust gas discharged from the engine of the motor vehicle and reduce fuel consumption thereof. In the conventional remote control type manual transmission, the neutral position is detected using an arrangement in which switches are provided for the plural shift rods thereof, the switches being connected in series and adapted to be closed when the respective shift rods are in their neutral positions. In the case where such a transmission includes three shift rods, for example, three swtiches are provided; thus, it is required that spaces for accommodating the three switches be secured in the casing of the transmission and also that three threaded holes for mounting the switches respectively be formed through the wall of the casing. Obviously, however, such a prior-art arrangement is disadvantageous in that the cost is inevitably increased and difficulty is encountered in designing the transmission to secure such spaces.

SUMMARY OF THE INVENTION

Accordingly, it is an object of the present invention to provide an apparatus for detecting the neutral position of a manual transmission for motor vehicles, which is so designed as to avoid the aforementioned disadvantages of the prior-art arrangement.

Briefly stated, in the apparatus embodying the present invention, a first and a second recess are provided which are movable with a first and a second shift rod, respectively; a swingable arm is provided which is arranged to be disposed in engagement with both the first and second recesses only when both the first and second shift rods are in their neutral positions; and a switch means is provided which is arranged to be closed when the arm is disposed in engagement with both the first and second recesses, and opened when the arm is positioned out of engagement with the first and second recesses, whereby the neutral position of the first and second shift rods is detected.

Other objects, features and advantages of the present invention will become apparent from the ensuing description taken in conjunction with the accompanying drawings.

DESCRIPTION OF THE PREFERRED EMBODIMENTS

A manual transmission of a type similar to that to which the present invention pertains is well known as disclosed in U.S. Pat. No. 2,552,765, for example, and therefore illustration and description of the gearing mechanism and so forth of the transmission to which the present invention is directed will be omitted.

Figure 1:
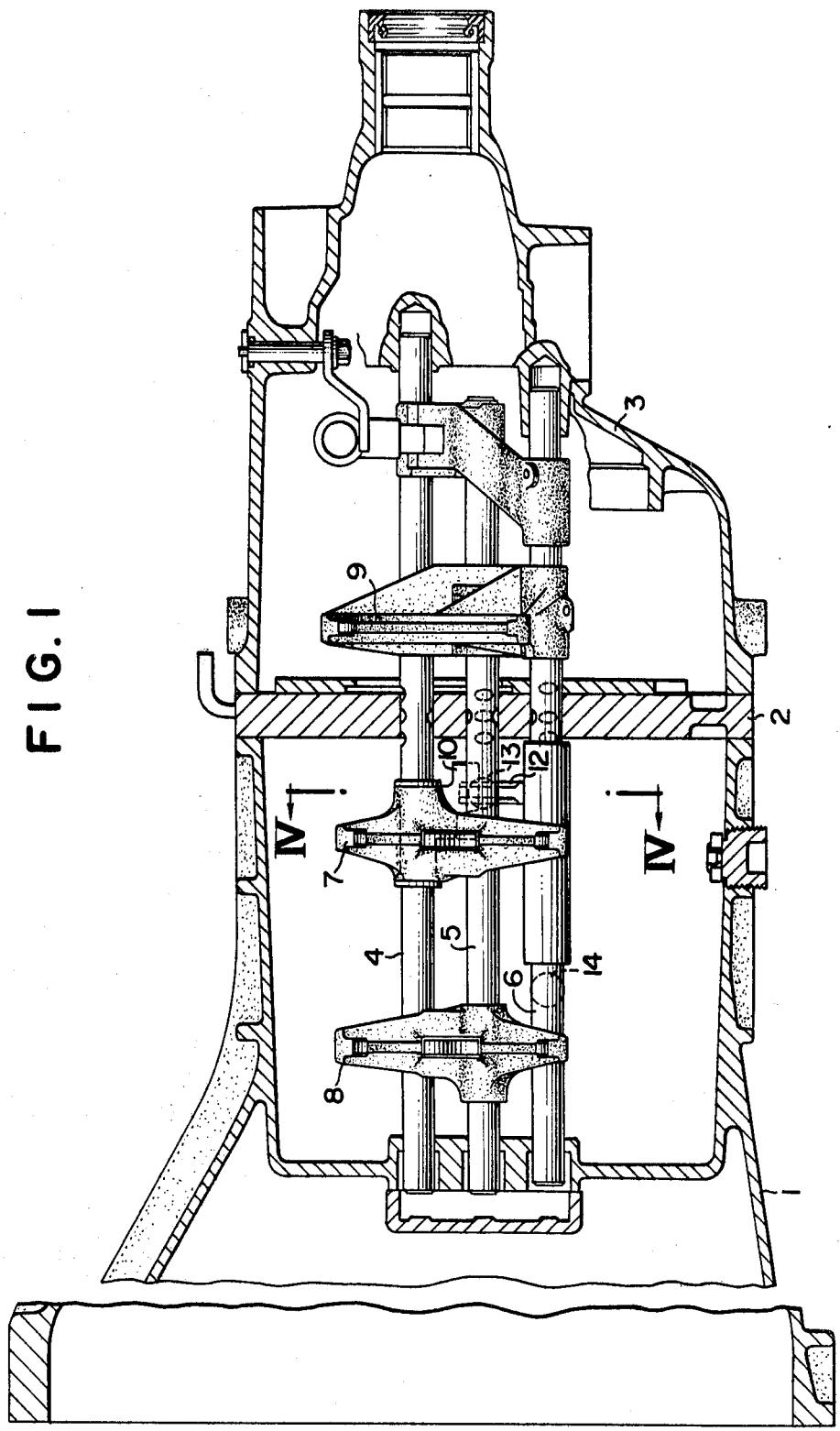
FIG. 1 is a schematic cross-sectional view of a transmission incorporating the apparatus for detecting the neutral position of the transmission according to the present invention.
Figure 2:
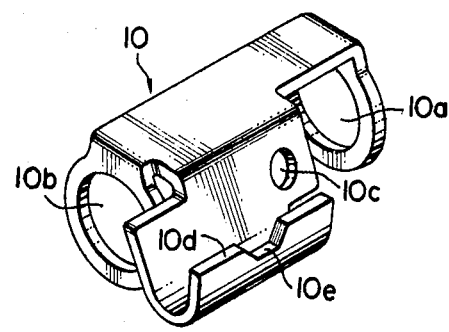
FIG. 2 is a perspective view showing a bracket constituting a part of the present apparatus.
Figure 3:
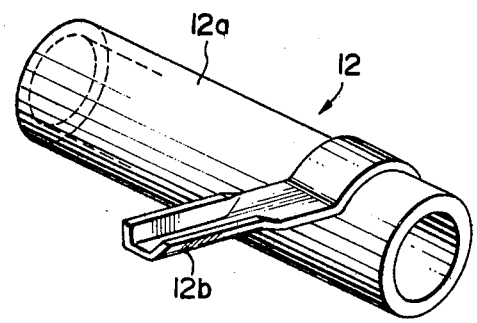
FIG. 3 is a perspective view showing an arm member constituting a part of the present apparatus.
Figure 6:
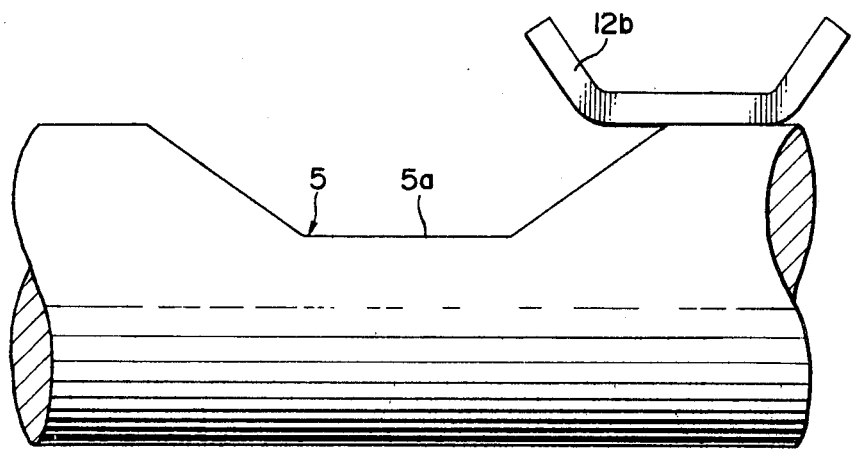
FIG. 6 is a diagram showing a positional relationship between a second-third speed shift rod and the arm.

Referring to FIG. 1, there is shown the gear shift mechanism of a manual transmission embodying the present invention. FIG. 1 shows a transmission casing composed of a transmission case 1, a flange 2 and an extension case 3 which house three shift rods, i.e., a 1-R (first speed— reverse) shift rod 4, a 2-3 (second speed—third speed) shift rod 5 and an overdrive shift rod 6 which are slidingly movable in the axial direction by predetermined distances. The 1-R shift rod 4, 2-3 shift rod 5 and overdrive shift rod 6 have a 1-R (first speed—reverse) shift fork 7, a 2-3 (second speed—third speed) shift fork 8 and an overdrive shift fork 9 respectively secured thereto. These forks are disposed in engagement with sleeves (not shown) so that a motor power transmission gearing is changed by moving the sleeves, whereby the gear ratio corresponding to the first speed, the second speed, the third speed, the overdrive or the reverse can be selectively attained. The shift rods 4, 5 and 6 are arranged to undergo respective predetermined displacements through a linkage (not shown) when a shift control lever (not shown) is manipulated by the driver. A bracket 10 such as shown in detail in FIG. 2 is mounted on the 1-R shift fork 7 secured to the 1-R shift rod 4. More specifically, the bracket 10 is formed with holes 10a and 10b through which the shift rod 4 extends and also with a mounting hole 10c through which a screw is threaded in or alternatively a pin is pressed into a hole formed in the shift fork 7, whereby the bracket is fixedly mounted on the shift fork 7. A trapezoidal recess 10e is formed in a bent edge portion 10d of the bracket 10, and a recess 5a, which is of a configuration similar to that of the recess 10e, is formed in the 2-3 shift rod 5 (refer to FIG. 6). As shown in detail in FIG. 3, an arm member 12 is mounted on the overdrive shift rod 6. The arm member 12 comprises a hollow shaft portion 12a loosely fitted over the overdrive shift rod 6 and an arm 12b welded or otherwise secured to the hollow shaft portion 12a. The arm 12b is of a trapezoidal cross-section corresponding to the trapezoidal form of the recess 10a formed in the bracket 10. The arm member 12 is restrained from axial movement by any suitable means. The positional arrangement is such that the arm 12b is disposed in engagement with the trapezoidal recess 10e of the bracket 10 when the 1-R shift rod 4 is in the neutral position; and the arm 12b is disposed in engagement with the recess 5a of the 2-3 shift rod 5 when the 2-3 shift rod 5 is in the neutral position. The positional relationship between the bracket 10 and the arm member 12 is illustrated in an enlarged sectional view in FIG. 4. It will be seen from this figure that a first switch 13 is disposed at a position to be actuated by the arm 12b when the latter swings. The first switch 13 is screwed into a threaded hole formed in the transmission case 1, and has a retractable projection or button 13a. When the button 13a is pushed in, the switch 13 is turned off, while when the button 13a is released, the switch 13 is turned on. A second switch 14 (FIG. 1), which may be similar to the first switch 13, is disposed in the transmission case 1 at a position corresponding to the overdrive shift rod 6 of the transmission case 1. The second switch 14 is turned on when the overdrive shift rod 6 is in its neutral position. The first switch 13 and the second switch 14 are connected in series with each other through lead wires not shown.

Description will now be made of the operation of the neutral position detecting apparatus according to the foregoing embodiment of the present invention.

Figure 4:
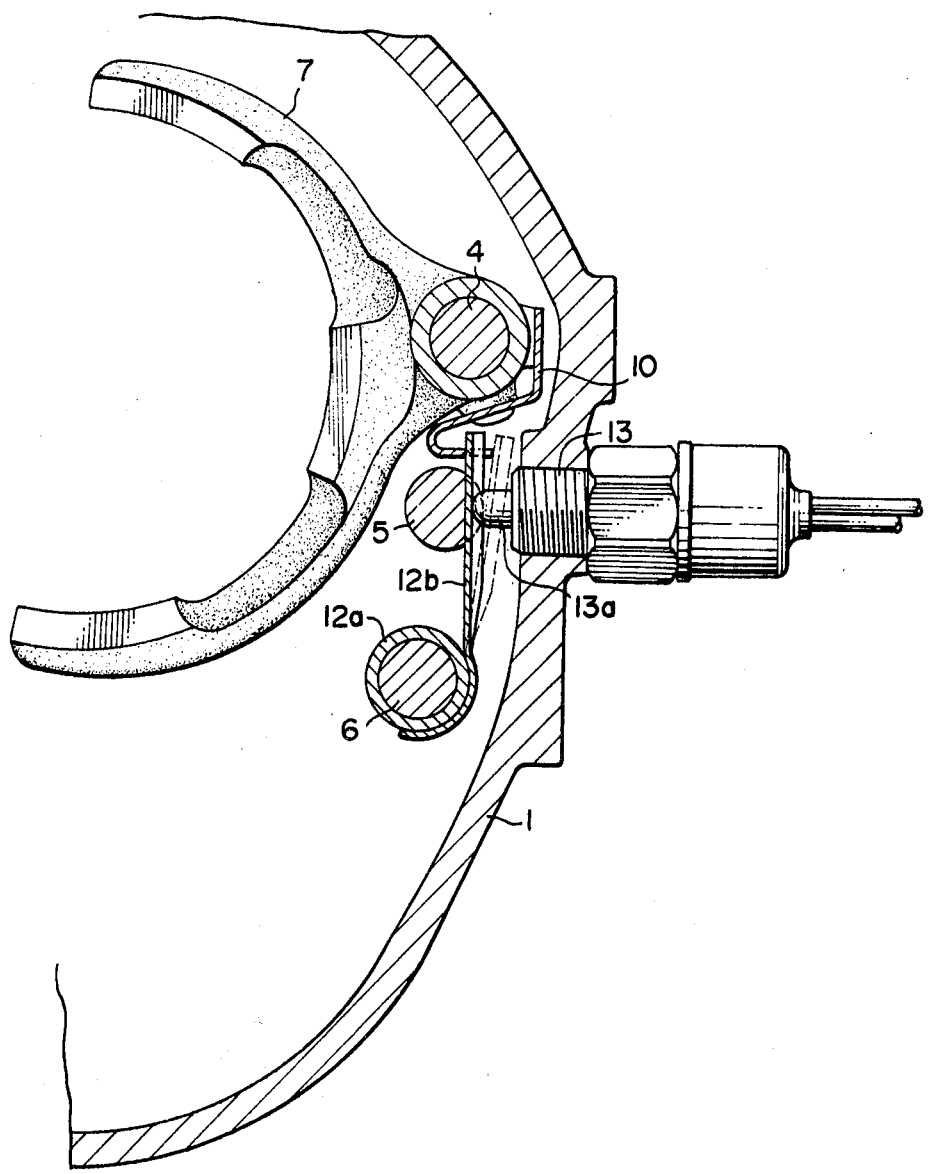
FIG. 4 is a sectional view taken along the line IV—IV in FIG. 1.
Figure 5:
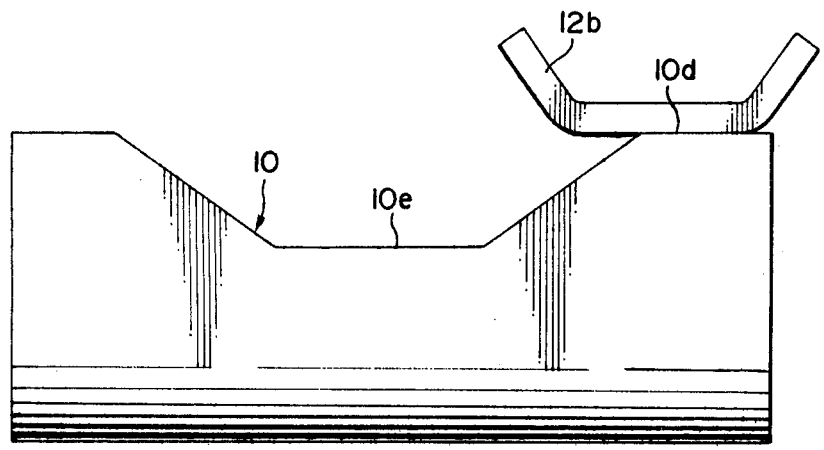
FIG. 5 is a diagram showing a positional relationship between the bracket and the arm.

When the 1-R shift rod 4 is not in its neutral position, namely, when the rod is in the first-speed or reverse position, the recess 10e of the bracket 10 is disposed out of registration with the arm 12b of the arm member 12, so that the arm 12b rides on the edge portion 10d of the bracket 10 as shown in FIG. 5. Thus, the arm 12b is located in a position indicated by a broken line in FIG. 4, and the projection 13a of the first switch is thereby depressed so that the first switch 13 is turned off. In this way, so long as the 1-R shift rod 4 is in the first-speed or reverse position, the first switch 13 remains turned off irrespective of the position of the 2-3 shift rod 5.

When the 2-3 shift rod 5 is not in its neutral position, namely, when the rod 5 is in the second-speed or third-speed position, the recess 5a of the 2-3 shift rod 5 is disposed out of registration with the arm 12b of the arm member 12, and thus the arm 12b is pushed by the shift rod 5 to be located at a position indicated by a broken line in FIG. 4. In such a state, the projection 13a of the first switch 13 is depressed by the arm 12b so that the first switch 13 is turned off. In this way, so long as the 2-3 shift rod 5 is in the second-speed or third-speed position, the first switch 13 remains turned off irrespective of the position of the 1-R shift rod 4.

It will thus be appreciated that the first switch 13 is always in the off state when the shift rod 4 or 5 is in any one of the first-speed, second-speed, third-speed and reverse positions.

When the 1-R shift rod 4 and 2-3 shift rod 5 are in their neutral positions, the arm 12b is disposed in registration with the recess 10e of the bracket 10 and the recess 5a of the 2-3 shift rod 5 so as to be located therein, as shown by a solid line in FIG. 4. In such a state, the projection 13a of the first switch 13 is not depressed by the arm 12b so that the first switch 13 remains turned on.

The second switch 14 is so arranged as to be turned on only when the overdrive shift rod 6 is in its neutral position. Since the second switch 14 is connected in series with the first switch 13, the circuit incorporating the first switch 13 and the second switch 14 is in the off state when at least one of the first switch 13 and the second switch 14 is in the off state, namely, when the shift rod 4 or 5 is in any one of the first-speed, second-speed, third-speed, overdrive and reverse positions. The aforementioned circuit is turned on only when both the first and second switches 13 and 14 are in the on state, namely, only when the shift rods 4, 5 and 6 are all in their neutral positions with the transmission being in the neutral state. In this way, the neutral state can be detected.

As will be appreciated from the foregoing discussion, in accordance with the present invention, the neutral position of two shift rods can be detected by a single switch, so that cost reduction as well as easiness of securing a space for installing the switch in the transmission case can be achieved to advantage.

While the present invention has been described and illustrate in connection with a specific embodiment thereof, it is to be understood that the present invention is by no means limited thereto and contemplates all changes and modifications which will become possible within the scope of the appended claims.

What is claimed is:

1. In combination with a remote control type manual transmission for motor vehicles, including a first, a second and a third shift rod, apparatus for detecting the neutral state of the transmission comprising:
   a bracket fixedly mounted on said first shift rod, said bracket having a first recess;
   said second shift rod having a second recess;
   a swingable arm member comprising a hollow shaft portion and an arm secured thereto, said swingable arm member being swingable mounted on said third shift rod, with said hollow shaft portion thereof loosely fitted thereover and restrained from axial displacement, said arm of said swingable arm member disposed in engagement with said first and second recesses only when said first and second shift rods are at their neutral position; and
   a first switch means adapted to be actuated by said swingable arm member when said arm is disposed in engagement with said first and second recesses.

2. An apparatus according to claim 1, further comprising a second switch means connected in series with said first switch means, said second switch means being adapted to be actuated only when said third shift rod is at its neutral position.

* * * * *